(12) United States Patent
Abe et al.

(10) Patent No.: US 11,359,431 B2
(45) Date of Patent: Jun. 14, 2022

(54) METHOD FOR MANUFACTURING PILLAR SUPPLY SHEET, METHOD FOR MANUFACTURING GLASS PANEL UNIT, AND METHOD FOR MANUFACTURING GLASS WINDOW

(71) Applicant: Panasonic Intellectual Property Management Co., Ltd., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Haruhiko Ishikawa, Osaka (JP); Tasuku Ishibashi, Ishikawa (JP); Takeshi Shimizu, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 237 days.

(21) Appl. No.: 16/489,671

(22) PCT Filed: Feb. 15, 2018

(86) PCT No.: PCT/JP2018/005235
§ 371 (c)(1),
(2) Date: Aug. 28, 2019

(87) PCT Pub. No.: WO2018/159305
PCT Pub. Date: Sep. 7, 2018

(65) Prior Publication Data
US 2020/0024891 A1    Jan. 23, 2020

(30) Foreign Application Priority Data
Feb. 28, 2017 (JP) .............................. JP2017-037679

(51) Int. Cl.
*C03C 27/06* (2006.01)
*E06B 3/663* (2006.01)
*E06B 3/67* (2006.01)

(52) U.S. Cl.
CPC .............. *E06B 3/663* (2013.01); *C03C 27/06* (2013.01); *E06B 3/6715* (2013.01)

(58) Field of Classification Search
CPC ................................ C03C 27/06; E06B 3/663
See application file for complete search history.

(56) References Cited

U.S. PATENT DOCUMENTS 5,499,128 A * 3/1996 Hasegawa ........... G02F 1/13394
349/155
6,210,763 B1    4/2001 Katoh et al.
(Continued)

FOREIGN PATENT DOCUMENTS

| JP | H11-79799 A | 3/1999 |
| JP | 2001-342043 A | 12/2001 |

(Continued)

OTHER PUBLICATIONS

International Search Report and Written Opinion issued in corresponding International Patent Application No. PCT/JP2018/005235, dated May 22, 2018, with partial translation.
(Continued)

*Primary Examiner* — Binh X Tran
(74) *Attorney, Agent, or Firm* — McDermott Will & Emery LLP

(57) ABSTRACT

A method for manufacturing a pillar supply sheet is a method for manufacturing a pillar supply sheet including a plurality of pillars, a carrier sheet, and an adhesion layer between each of the pillars and the carrier sheet, the method including a pillar forming step. The pillar forming step is a step of forming the plurality of pillars by subjecting the base (Continued)

member to an etching process or a laser irradiation process and removing an unnecessary portion from the base member after the process.

11 Claims, 12 Drawing Sheets

(56) References Cited

U.S. PATENT DOCUMENTS

| | | | |
|---|---|---|---|
| 6,479,112 B1* | 11/2002 | Shukuri | E06B 3/66304 428/34 |
| 10,000,407 B2* | 6/2018 | Tian | E06B 3/6612 |
| 10,253,550 B1* | 4/2019 | Kim | E06B 3/6612 |
| 2013/0139948 A1 | 6/2013 | Raggio | |
| 2014/0335291 A1 | 11/2014 | Hasegawa et al. | |
| 2014/0356558 A1 | 12/2014 | Hasegawa et al. | |
| 2015/0187510 A1* | 7/2015 | Naito | H01L 51/448 428/76 |
| 2016/0026061 A1* | 1/2016 | O'Keeffe | G02F 1/13306 359/296 |
| 2017/0226791 A1 | 8/2017 | Hasegawa et al. | |
| 2018/0051506 A1 | 2/2018 | Abe et al. | |

FOREIGN PATENT DOCUMENTS

| | | |
|---|---|---|
| JP | 2004-352566 A | 12/2004 |
| JP | 2016-088775 A | 5/2016 |
| KR | 2011-0120804 A | 11/2011 |
| WO | 2013/132869 A1 | 9/2013 |
| WO | 2016/152052 A1 | 9/2016 |

OTHER PUBLICATIONS

Extended European Search Report dated Feb. 7, 2020 issued in corresponding European Patent Application No. 18761651.1.

* cited by examiner

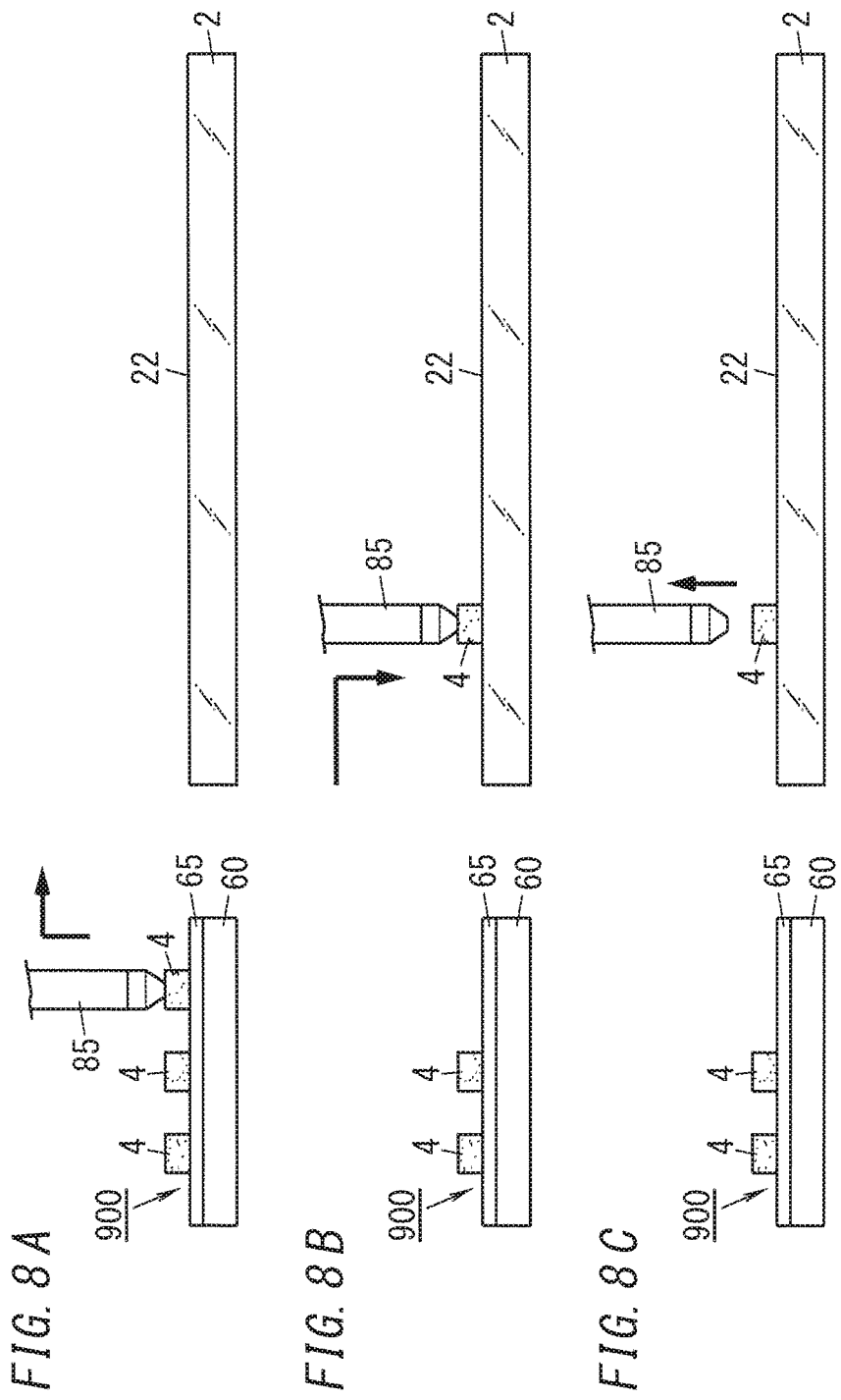

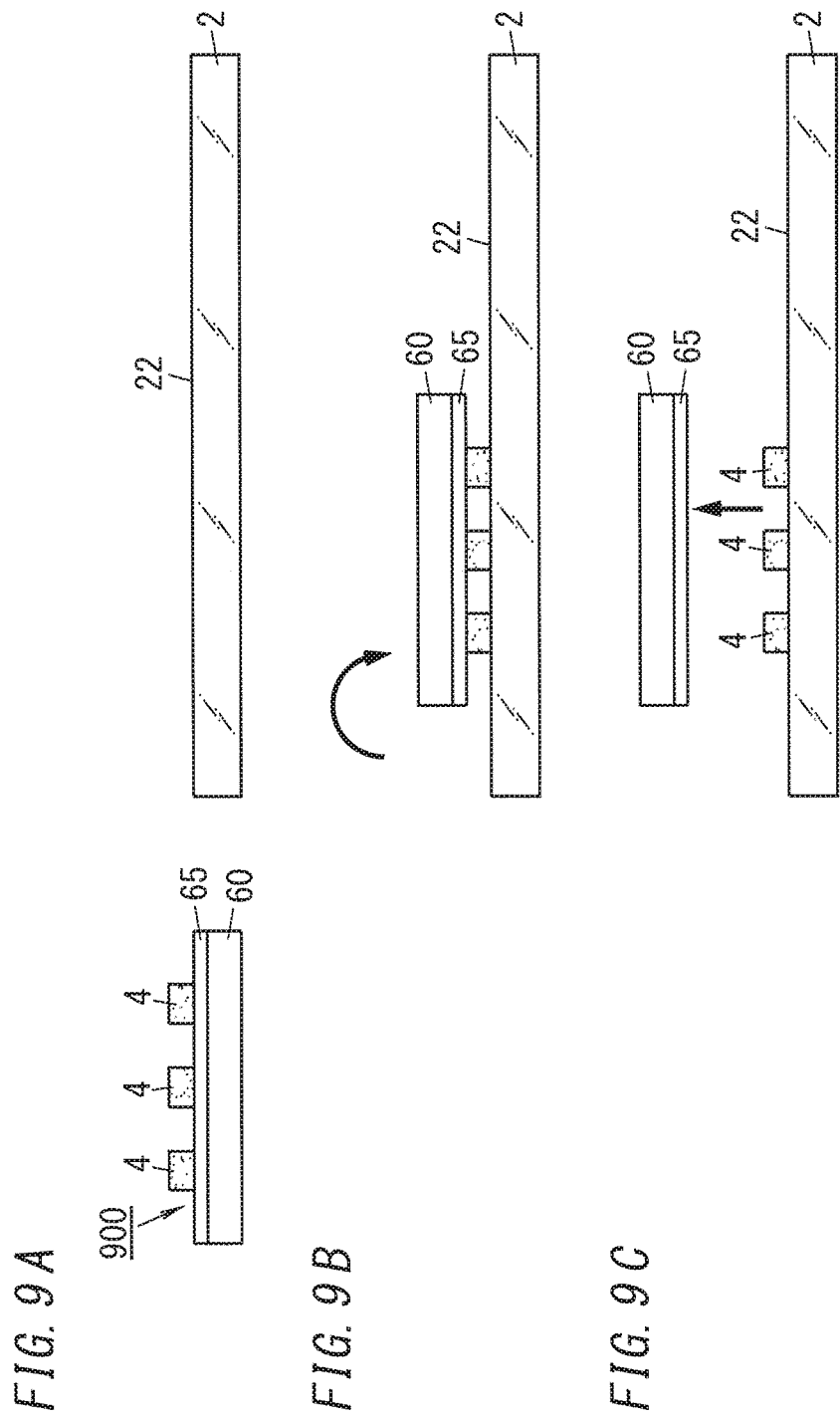

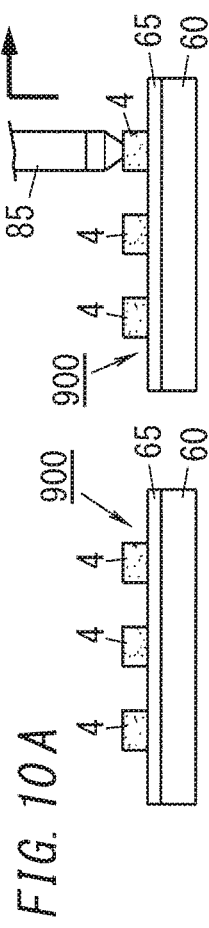
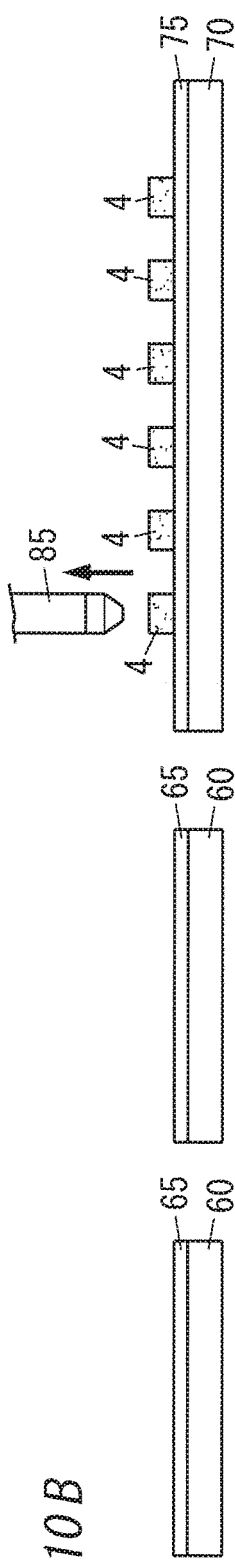
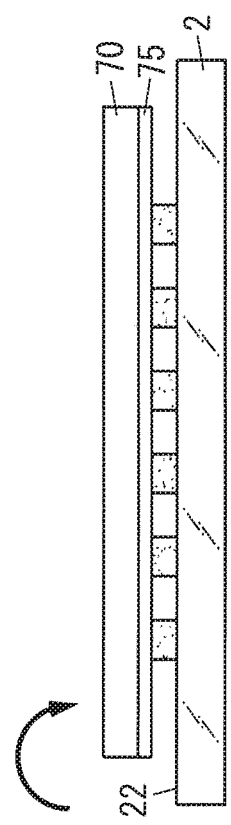
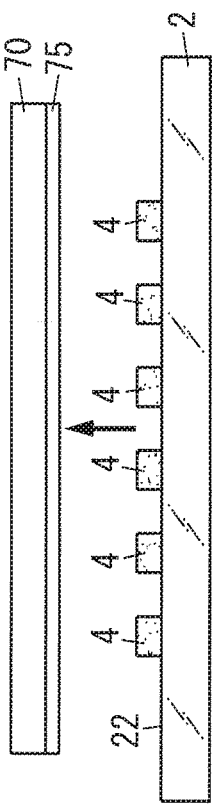
FIG. 10A
FIG. 10B
FIG. 10C
FIG. 10D

METHOD FOR MANUFACTURING PILLAR SUPPLY SHEET, METHOD FOR MANUFACTURING GLASS PANEL UNIT, AND METHOD FOR MANUFACTURING GLASS WINDOW

CROSS-REFERENCE OF RELATED APPLICATIONS

This application is the U.S. National Phase under 35 U.S.C. § 371 of International Patent Application No. PCT/JP2018/005235, filed on Feb. 15, 2018, which in turn claims the benefit of Japanese Application No. 2017-037679, filed on Feb. 28, 2017, the entire disclosures of which Applications are incorporated by reference herein.

TECHNICAL FIELD

The present disclosure relates to a method for manufacturing a pillar supply sheet, a method for manufacturing a glass panel unit, and a method for manufacturing a glass window. The present disclosure specifically relates to a method for manufacturing a pillar supply sheet for supplying a plurality of pillars, a method for manufacturing a glass panel unit, and a method for manufacturing a glass window, wherein the method for manufacturing the glass panel unit and the method for manufacturing the glass window include the method for manufacturing the pillar supply sheet.

BACKGROUND ART

A glass panel unit including a pair of substrates and pillars sandwiched between the pair of substrates has been known.

To manufacture such a glass panel unit, a plurality of pillars are mounted on one substrate such that the plurality of pillars are apart from each other, and another substrate is disposed to face the one substrate such that the plurality of pillars are sandwiched between the one substrate and the another substrate (see, for example, Patent Literature 1).

In the above-described known method, a large number of pillars used for manufacturing of a glass panel unit are formed by punching or the like and are then stored, and of the large number of pillars thus stored, a required number of pillars are sequentially taken out to be mounted on the substrate.

In this case, when the large number of pillars stored are not uniformly oriented, the pillars are not easily mounted on the substrate in an appropriate orientation. Moreover, when pillars charged are adsorbed on each other while stored, appropriately mounting the pillars on the substrate is not easy.

CITATION LIST

Patent Literature

Patent Literature 1: JP H11-79799 A

SUMMARY OF INVENTION

It is an object of the present disclosure to enable a plurality of pillars to be appropriately and easily mounted on a substrate so as to efficiently manufacture a glass panel unit.

In a method for manufacturing a pillar supply sheet according to one aspect of the present disclosure, the pillar supply sheet includes a plurality of pillars for maintenance of a distance between a first substrate and a second substrate included in a glass panel unit; a carrier sheet on which the plurality of pillars are arranged apart from each other; and an adhesion layer between the carrier sheet and the plurality of pillars. The method for manufacturing the pillar supply sheet includes a pillar forming step of forming the plurality of pillars by subjecting a base member to an etching process or a laser irradiation process and removing an unnecessary portion from the base member.

A method for manufacturing a glass panel unit according to one aspect of the present disclosure includes a step of manufacturing the pillar supply sheet by the method for manufacturing the pillar supply sheet, a pillar mounting step, and a binding step. The pillar mounting step is a step of mounting the plurality of pillars on at least one of the first substrate or the second substrate. The binding step is a step of hermetically binding the first substrate and the second substrate together with a sealing member. The first substrate and the second substrate are disposed to face each other with the plurality of pillars being sandwiched between the first substrate and the second substrate. The sealing member has a frame shape enclosing the plurality of pillars.

A method for manufacturing glass window according to one aspect of the present disclosure includes a fitting step of fitting, into a window frame, the glass panel unit.

BRIEF DESCRIPTION OF DRAWINGS

FIG. 8A is a side view illustrating a first procedure of a first procedure of a first mounting method using the pillar supply sheet, FIG. 8B is a side view illustrating a second procedure of the first mounting method, FIG. 8C is a side view illustrating a third procedure of the first mounting method;

FIG. 9A is a side view illustrating a first procedure of a first procedure of a second mounting method using the pillar supply sheet, FIG. 9B is a side view illustrating a second procedure of the second mounting method, FIG. 9C is a side view illustrating a third procedure of the second mounting method;

FIG. 10A is a side view illustrating a first procedure of a first procedure of a third mounting method using the pillar supply sheet, FIG. 10B is a side view illustrating a second procedure of the third mounting method, FIG. 10C is a side view illustrating a third procedure of the third mounting method, FIG. 10D is a side view illustrating a fourth procedure of the third mounting method;

DESCRIPTION OF EMBODIMENTS

Figure 1A:
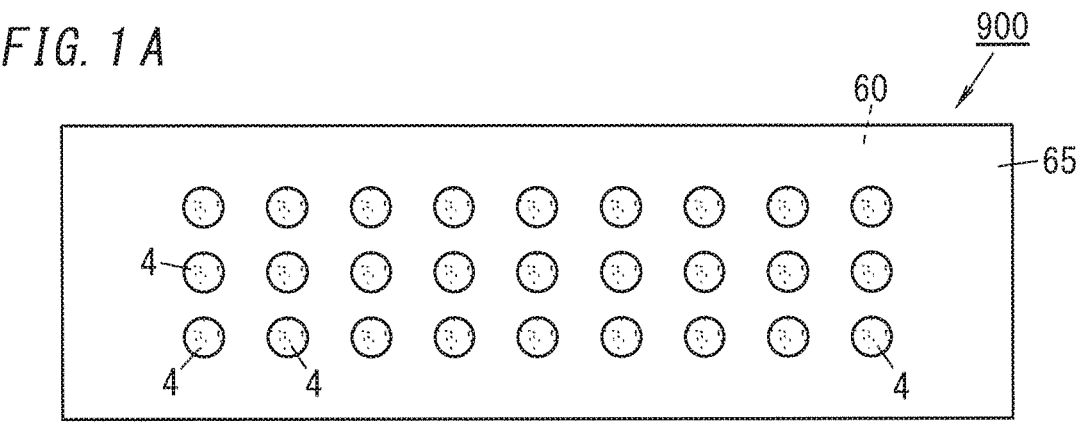
FIG. 1A is a plan view illustrating a pillar supply sheet of one embodiment.

With reference to the drawings, a pillar supply sheet 900, a glass panel unit 90, and a glass window 9 of one embodiment will be sequentially described. Note that the drawings schematically show components, and therefore, the dimensional shape of each component in the drawings is different from actual dimensional shape.

(Pillar Supply Sheet)

First, a schematic configuration of the pillar supply sheet (spacer supply sheet) 900 of one embodiment will be described.

Figure 12:
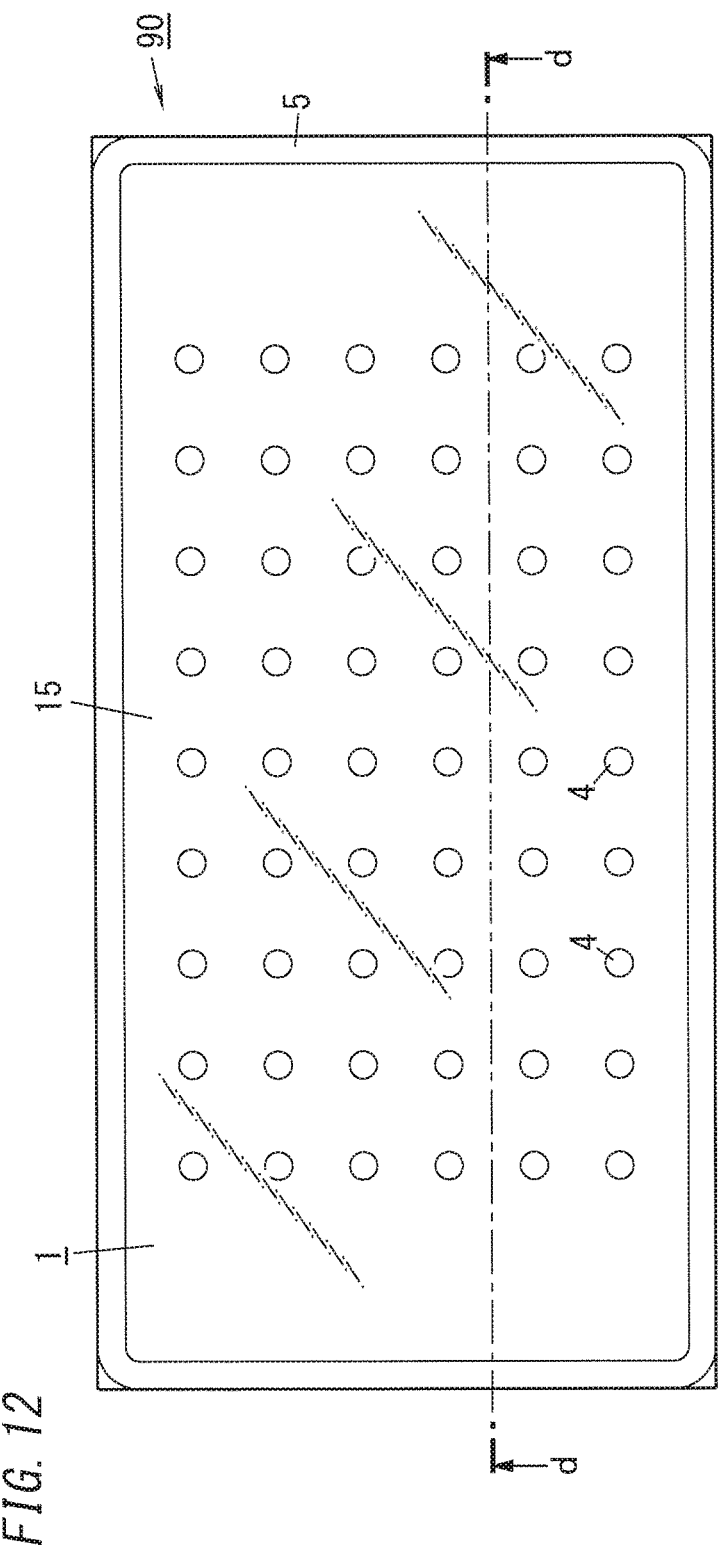
FIG. 12 is a plan view illustrating the glass panel unit manufactured by using the pillar supply sheet.
Figure 13:
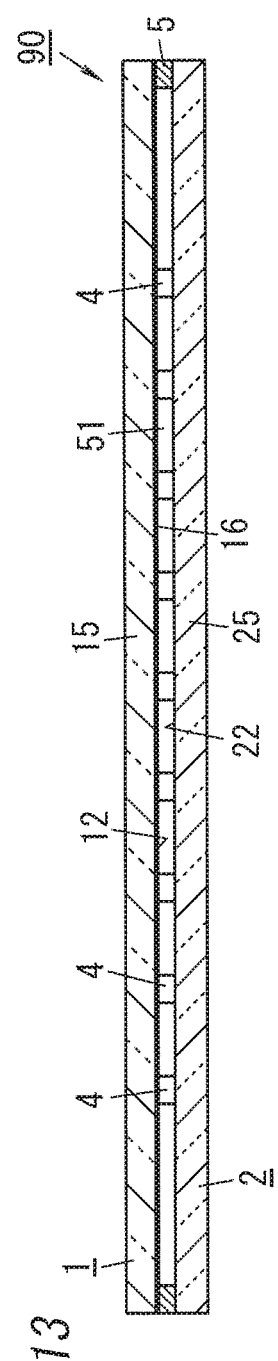
FIG. 13 is a sectional view taken along line d-d of FIG. 12.

The pillar supply sheet 900 is used to manufacture the glass panel unit 90 (see, for example, FIGS. 12 and 13). Specifically, the pillar supply sheet 900 is used to: hold a plurality of pillars (spacers) 4 to be included in the glass panel unit 90 in a state where the plurality of pillars 4 are apart from each other; and transport the plurality of pillars 4 to a manufacturing site of the glass panel unit 90 while the state is maintained.

Figure 1B:
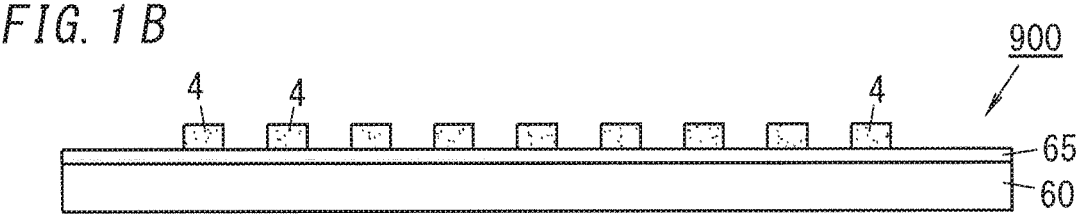
FIG. 1B is a side view illustrating the pillar supply sheet.

As illustrated in FIGS. 1A and 1B, the pillar supply sheet 900 includes the plurality of pillars 4, a carrier sheet 60, and an adhesion layer 65.

The plurality of pillars 4 will be described.

Each of the plurality of pillars 4 has a cylindrical shape. Each pillar 4 is preferably made of a low thermal conductivity resin. Each pillar 4 is particularly preferably made of polyimide or polyimide benzoxazole because in this case, high strength, low thermal conductivity, and heat resistance are concurrently realized. However, the material for each pillar 4 is not limited to the resin but may be metal, glass, ceramic, a carbon material, or a material obtained by combining these materials (a resin, metal, glass, ceramic, a carbon material and the like).

The outer shape of each pillar 4 is not limited to the cylindrical shape but may be another outer shape such as an oblong cylindrical shape, a hexagonal prism shape, or the like. Moreover, each pillar 4 is not limited to a solid pillar but may be a hollow (tubular) pillar. The dimension of each pillar 4 is not particularly limited, but each pillar 4 prefer- ably has: a diameter set within a range from 50 to 1000 μm; and a height in an axial direction set within a range from 50 to 300 μm.

The carrier sheet 60 will be described.

The carrier sheet 60 is a sheet for supporting the plurality of pillars 4 in the prescribed arrangement and position. The carrier sheet 60 has a rectangular shape. The carrier sheet 60 is preferably made of a resin such as polyethylene terephthalate, but the material for the carrier sheet 60 is not limited to the resin but may be glass, metal, or a material obtained by combining these materials (resin, glass, metal, and the like).

The adhesion layer 65 will be described.

The adhesion layer 65 is a layer for bonding the plurality of pillars 4 to one surface of the carrier sheet 60. In this embodiment, the adhesion layer 65 is formed on the entire one surface of the carrier sheet 60, but the area in which the adhesion layer 65 is formed is not limited to this embodiment. The adhesion layer 65 is at least located between each of the pillars 4 and the carrier sheet 60.

The adhesion layer 65 is at least configured to satisfactorily hold each pillar 4 during storage and transportation of the pillar supply sheet 900 and to allow each pillar 4 to be easily detached (i.e., peeled) when the pillar supply sheet 900 is used. The adhesion layer 65 is formable of, for example, a weak adhesive agent (a weak sticking agent). In this case, the adhesive strength (shear adhesive strength) of the adhesion layer 65 is preferably set to 1N/25 mm or less in the 180° peeling test based on JIS standard number [JISZ0237].

Note that the adhesion layer 65 is not limited to a layer made of the weak adhesive agent but may be made of an adhesive agent whose adhesive strength is reduced by external stimulation such as light or heat.

The above-described configuration of the pillar supply sheet 900 enables the pillar supply sheet 900 to hold the pillars 4 by using the carrier sheet 60 and the adhesion layer 65 in an appropriate arrangement and positions during the storage and the transportation of the pillar supply sheet 900.

(Method for Manufacturing Pillar Supply Sheet)

Next, a method for manufacturing the pillar supply sheet 900 will be described.

The method for manufacturing the pillar supply sheet 900 includes, for example, a first method adopting laser processing and a second method adopting etching.

First, the first method will be described.

The first method includes a preparation step and a pillar (spacer) forming step.

Figure 2A:
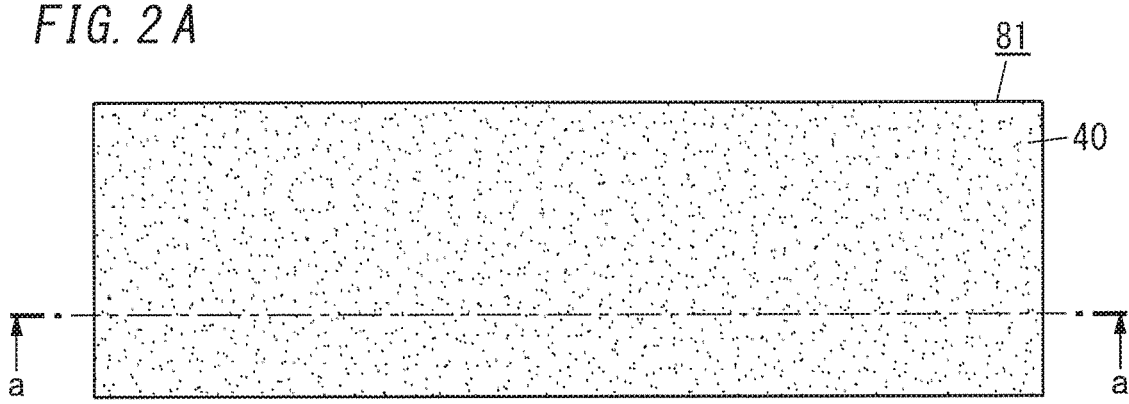
FIG. 2A is a plan view illustrating an in-process product used for manufacturing the pillar supply sheet.
Figure 2B:
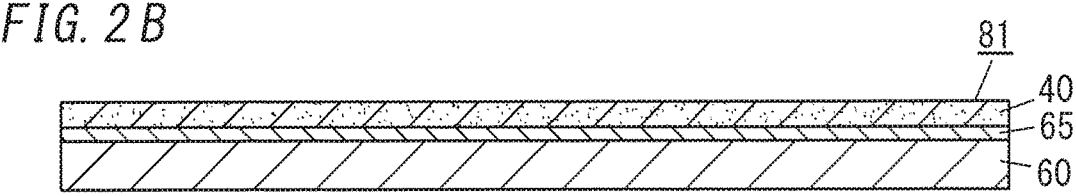
FIG. 2B is a sectional view taken along line a-a of FIG. 2A.

The preparation step is a step of preparing an in-process product 81 which is to be subjected to the laser processing. As illustrated in FIGS. 2A and 2B, the in-process product 81 has a structure including the carrier sheet 60, the adhesion layer 65 on one surface of the carrier sheet 60, and a base member 40 on the adhesion layer 65.

The base member 40 is a sheet-like member serving as a basis of the plurality of pillars 4 and is made of the same material as the pillars 4. That is, the base member 40 is made of, for example, a low thermal conductivity resin, but the material for the base member 40 is not limited to the resin but may be metal, glass, ceramic, a carbon material, or a material obtained by combining these materials (a resin, metal, glass, ceramic, a carbon material, and the like).

The pillar forming step (spacer forming step) is a step of subjecting the base member 40 of the in-process product 81 to a laser irradiation process and removing an unnecessary portion 45 (see, for example, FIG. 4A) from the base member 40 after the process. In the pillar forming step, the plurality of pillars 4 are formed in a state where the plurality of pillars 4 are bonded to the carrier sheet 60 with the adhesion layer 65.

As a laser beam for irradiation, an appropriate laser beam is selected from a plurality of types of laser beams in accordance with the material for the base member 40. Selectable laser beams are, for example, a green laser beam, a UV laser beam, an excimer laser beam, an argon laser beam, and a He—Ne laser beam. For example, when the material for the base member 40 is polyimide benzoxazole, a second-harmonic green laser beam or a third-harmonic UV laser beam is preferably selected.

Moreover, a laser beam with which the base member 40 is irradiated is preferably a pulse laser beam such as a picosecond laser beam, a femtosecond laser beam, or a nanosecond laser beam. When the laser beam with which the base member 40 is irradiated is the pulse laser beam, it is possible to perform processing while heat caused by the laser beam is released.

When heat caused by the laser beam for irradiation accumulates in the adhesion layer 65, the adhesion layer 65 is likely to be melted. Moreover, when heat caused by the laser beam for irradiation accumulates in the base member 40, the base member 40 is likely to be burned particularly in the case of the base member 40 being a resin, and when the base member 40 is a stacked layer member, the stacked layer member is likely to peel due to thermal stress. These problems are solved when the laser beam is the pulse laser beam.

Figure 3A:
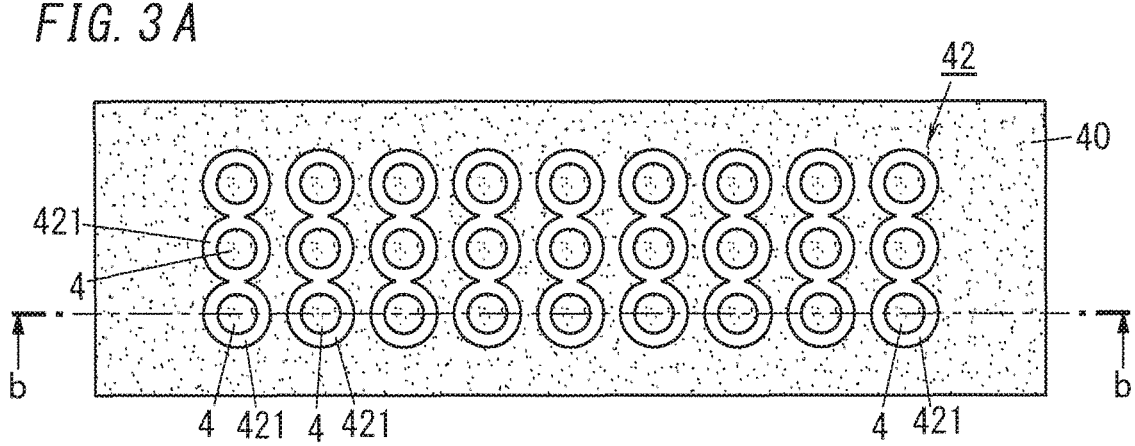
FIG. 3A is a plan view illustrating a state where the in-process product is processed with a laser beam.
Figure 3B:
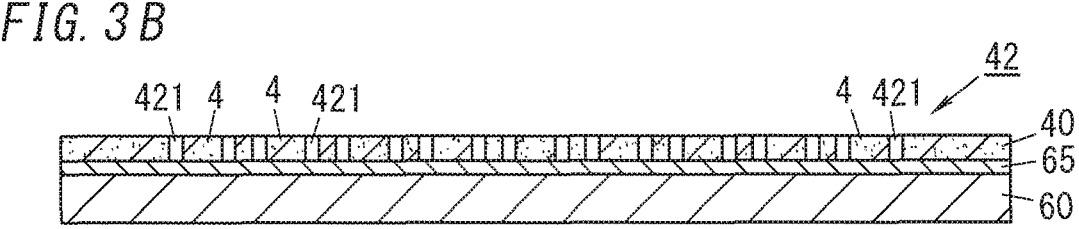
FIG. 3B is a sectional view taken along line b-b of FIG. 3A.

The laser irradiation precisely draws a pattern 42 which is geometric as illustrated in FIGS. 3A and 3B on the base member 40 of the in-process product 81. The pattern 42 includes a plurality of annular (circular) patterns 421. Each pattern 421 penetrates through the base member 40 in a thickness direction of the base member 40. Portions surrounded by the patterns 421 of the base member 40 processed with a laser beam form the pillars 4 which are cylindrical.

Figure 4A:
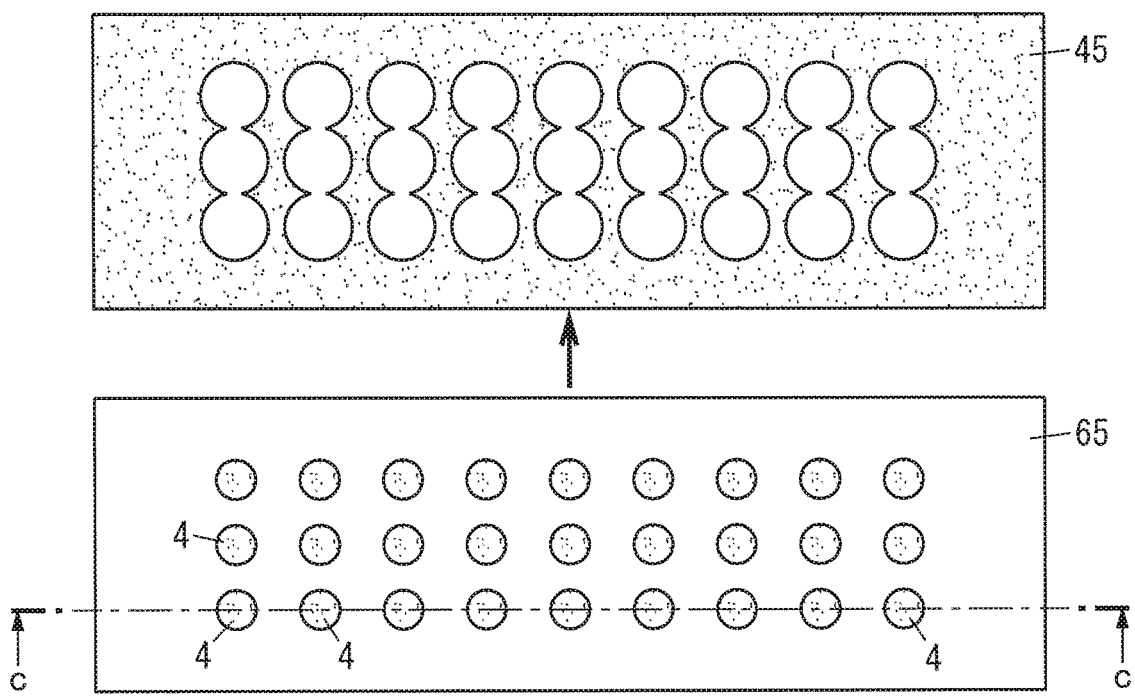
FIG. 4A is a plan view illustrating a state where an unnecessary portion is removed from the in-process product.
Figure 4B:
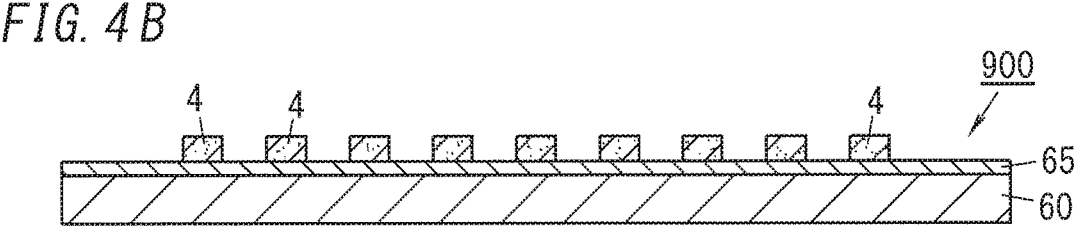
FIG. 4B is a sectional view taken along line c-c of FIG. 4A.

Then, as illustrated in FIGS. 4A and 4B, the unnecessary portion 45 is peeled from the adhesion layer 65 of the base member 40 after the laser irradiation, thereby obtaining the pillar supply sheet 900 provided with the plurality of pillars 4. The unnecessary portion 45 is a portion excluding the portions (portions forming the plurality of pillars 4) surrounded by the plurality of patterns 421 from the base member 40.

Note that when the base member 40 is subjected to the laser irradiation process as in the first method, the carrier sheet 60 having higher transmittance of a laser beam than the base member 40 is preferably adopted. In this way, it is possible to reduce influence of the laser beam for processing the base member 40 over the carrier sheet 60.

Figure 5A:
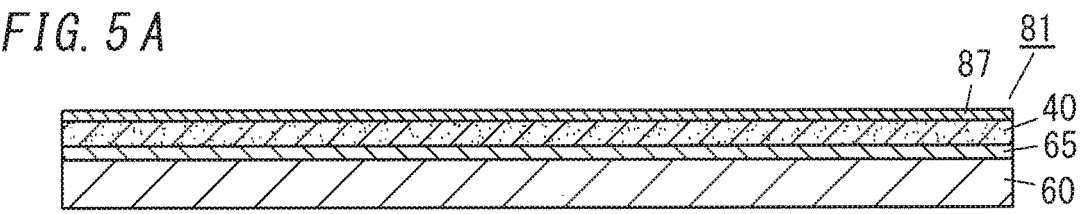
FIG. 5A is a sectional view illustrating the in-process product used for manufacturing the pillar supply sheet by etching.
Figure 5B:
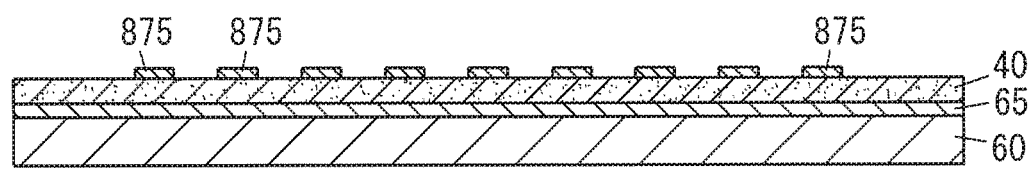
FIG. 5B is a sectional view illustrating a state where the in-process product is exposed to light and developed.
Figure 5C:
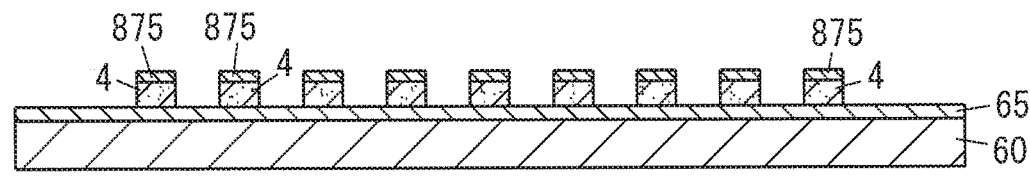
FIG. 5C is a sectional view illustrating a state where the in-process product is etched.
Figure 5D:
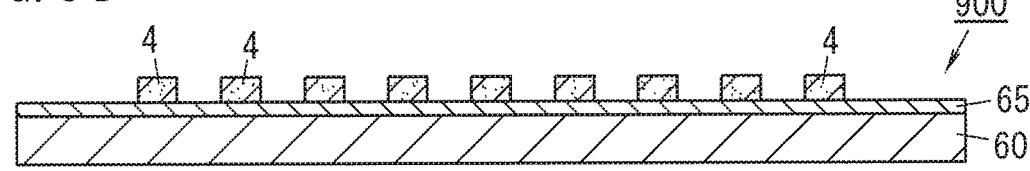
FIG. 5D is a sectional view illustrating a state where a remaining portion of a resist is removed from the in-process product.

Next, the second method adopting etching will be described with reference to FIGS. 5A and 5D. FIGS. 5A and 5D show a procedure for manufacturing the pillar supply sheet 900 by the second method.

Note that in the following description, components similar to those in the first method are denoted by the same reference signs, and the detailed description thereof will be omitted.

The second method includes a preparation step and a pillar forming step. The preparation step is a step of preparing an in-process product 81 which is to be etched. The in-process product 81 has a structure including a carrier sheet 60, an adhesion layer 65 on one surface of the carrier sheet 60, and a base member 40 on the carrier sheet 60.

The pillar forming step is a step of forming a plurality of pillars 4 from the base member 40 by etching the base member 40 of the in-process product 81 by the procedure shown in FIGS. 5A and 5D.

As illustrated in FIG. 5A, a resist 87 is formed to cover the entirety of an upper surface of the base member 40. The resist 87 is subjected to an exposure process and a development process, and thereby, a remaining portion 875 of the resist 87 remains with a prescribed shape as illustrated in FIG. 5B. When the etching process is performed by using the remaining portion 875, the base member 40 is etched in a prescribed shape as illustrated in FIG. 5C, and the plurality of pillars 4 are formed in a state where the plurality of pillars 4 are bonded to the carrier sheet 60 with the adhesion layer 65.

As the etching process mentioned herein, an appropriate process is selected, in accordance with the material for the base member 40, from various types of etching processes including a wet etching process and a dry etching process.

Then, the remaining portion 875 of the resist 87 is removed from the base member 40 (plurality of pillars 4) after the etching process, thereby obtaining the pillar supply sheet 900 provided with the plurality of pillars 4 as illustrated in FIG. 5D.

The first method and the second method have been described above, but the method for manufacturing the pillar supply sheet 900 is not limited to this example.

For example, in the pillar forming step, the base member 40 is not processed in a state where the base member 40 is bonded to the carrier sheet 60, but the base member 40 may be processed in a state where the base member 40 is separated from the carrier sheet 60.

In this case, the pillar supply sheet 900 is manufactured by the pillar forming step and a disposition step. In the pillar forming step, the base member 40 separated from the carrier sheet 60 is subjected to the etching process or the laser irradiation process and an unnecessary portion is removed from the base member 40 after the process, thereby forming the plurality of pillars 4. In the disposition step, the plurality of pillars 4 formed in the pillar forming step are arranged on the adhesion layer 65 on the carrier sheet 60.

In particular, when the material of the base member 40 is a high-hardness resin (e.g., polyimide or polyimide benzoxazole), it is difficult to obtain pillars 4 having a satisfactory shape by machining such as punching. In contrast, performing the etching process or the laser irradiation process provides the advantage that the pillars 4 each having a satisfactory shape are easily obtained even when the material for the base member 40 is the high-hardness resin.

(Variations of Pillar Supply Sheet)

Next, with reference to FIGS. 6A to 6E and FIG. 7, variations (first to fifth variations) of the pillar supply sheet 900 will be described. Note that components similar to those already described in connection with the pillar supply sheet 900 are denoted by the same reference signs, and the detailed description thereof will be omitted.

Figure 6A:
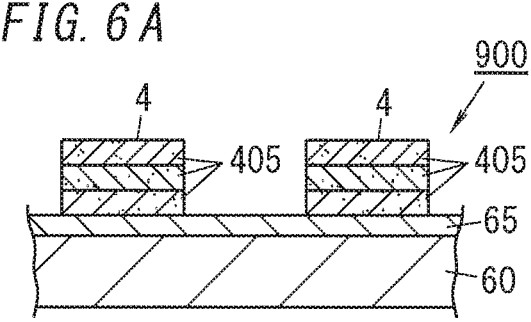
FIG. 6A is a sectional view illustrating a main part of a first variation of the pillar supply sheet.

FIG. 6A shows a main part of the first variation of the pillar supply sheet 900. In the first variation, pillars 4 each have a multilayer structure including a plurality of resin layers 405 which are stacked on each other. In the first variation, a solvent is easily released from each of the resin layers 405 in the course of forming the pillars 4, and therefore, high strength is easily realized as compared to a case where the pillars 4 each include a single resin layer.

Figure 6B:
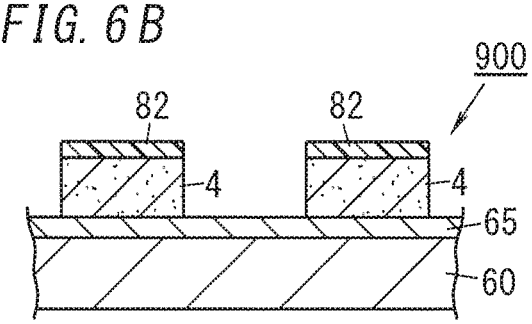
FIG. 6B is a sectional view illustrating a main part of a second variation of the pillar supply sheet.

FIG. 6B shows a main part of the second variation of the pillar supply sheet 900. In the second variation, pillars 4 each include a second adhesion layer 82. The second adhesion layer 82 is formed on one surface of both surfaces in the axial direction (height direction) of each pillar 4, and the one surface is opposite a surface of each pillar 4 which is bonded to an adhesion layer 65.

That is, the method for manufacturing the second variation of the pillar supply sheet 900 further includes a second adhesion layer forming step. The second adhesion layer forming step is a step of providing the second adhesion layer 82 on the surface opposite the surface of each pillar 4 which is bonded to the adhesion layer 65.

According to the second variation of the pillar supply sheet 900, each pillar 4 and a second substrate 2 can be bonded together with the second adhesion layer 82 when each pillar 4 is mounted on the second substrate 2 by a transfer method which will be described later. Thus, it is possible to efficiently manufacture a glass panel unit 90.

Figure 6C:
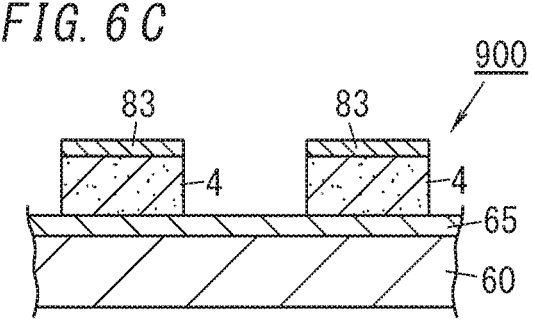
FIG. 6C is a sectional view illustrating a main part of a third variation of the pillar supply sheet.

FIG. 6C shows a main part of the third variation of the pillar supply sheet 900. In the third variation, pillars 4 each include a conductor layer 83. The conductor layer 83 is formed on one surface of both surfaces in the axial direction (height direction) of each pillar 4, and the one surface is opposite a surface of each pillar 4 which is bonded to an adhesion layer 65.

That is, the method for manufacturing the third variation of the pillar supply sheet 900 further includes a conductor layer forming step. The conductor layer forming step is a step of providing the conductor layer 83 on the surface opposite the surface of each pillar 4 bonded to the adhesion layer 65.

The conductor layer 83 is preferably made of metal such as aluminum, copper, or silver, and is also preferably made of a conductive oxide such as ZnO or $SnO_2$. Moreover, the conductor layer 83 is preferably made of a soft material (e.g., soft metal or soft conductive property oxide). If the conductor layer 83 is hard, the conductor layer 83 may damage other members (e.g., first substrate 1) If the conductor layer 83 is soft, the possibility that the conductor layer 83 damages other members may be reduced.

According to the third variation of the pillar supply sheet 900, each pillar 4 has the conductor layer 83, thereby reducing charging of each pillar 4. Thus, it is possible to reduce electrical adsorption of a charged pillar 4 on another member or electrical adsorption of charged pillars 4 on each other.

Figure 6D:
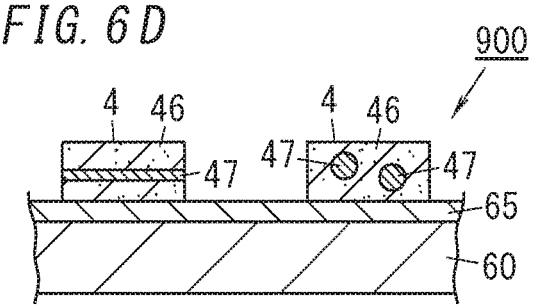
FIG. 6D is a sectional view illustrating a main part of a fourth variation of the pillar supply sheet.

FIG. 6D shows a main part of the fourth variation of the pillar supply sheet 900. In the fourth variation, pillars 4 each include a portion 46 made of a main material and a portion 47 made of a sub-material having a higher specific gravity than the main material. For example, the main material is a resin, and the sub-material is metal.

In the fourth variation of the pillar supply sheet 900, the mass of the pillar 4 can be increased as compared to a case where the pillar 4 is made of only a main material (resin). When the weight of each pillar 4 is light, each pillar 4 is hardly separated from a suction pin 85 or a transferring sheet 70 which will be described later, but this problem is solved by the pillars 4 each including the portion 47 having a high specific gravity.

Figure 6E:
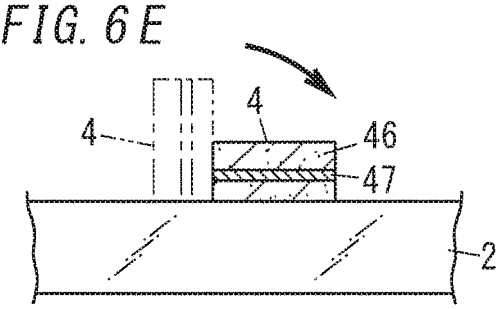
FIG. 6E is a partially cutaway view illustrating how the pillar in the fourth variation of the pillar supply sheet falls.

Moreover, in the fourth variation, an area occupied by the portion 47 having the high specific gravity is set in the pillar 4, thereby freely setting the location of the center of gravity of the pillar 4. In the pillar 4 on the left side in FIG. 6D, the center of gravity of the pillar 4 is shifted from the center (shifted to a lower side from the center) in the axial direction. Thus, for example, the pillar 4 is configured such that when the pillar 4 on the left side is not mounted on a second substrate 2 in an appropriate position, the pillar 4 naturally falls to take an appropriate position as illustrated in FIG. 6E.

Figure 7:
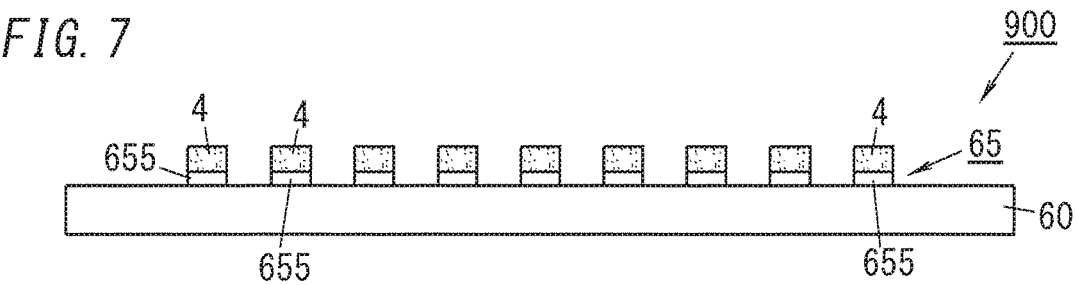
FIG. 7 is a side view illustrating a fifth variation of the pillar supply sheet.

FIG. 7 shows the fifth variation of the pillar supply sheet 900. In the fifth variation, an adhesion layer 65 includes a plurality of adhesion sublayers 655 separated to be apart from each other. A plurality of pillars 4 are bonded, on a one-to-one basis, to the plurality of adhesion sublayers 655 separated. The plurality of adhesion sublayers 655 separated can be formed by, for example, laser processing by the first method to the adhesion layer 65 of the in-process product 81 or etching by the second method to the adhesion layer 65.

The various types of variations of the pillar supply sheet 900 have been described, but further modification of design may be made to various types of variations, or characteristic configurations of the various types of variations may be combined with each other.

(Glass Panel Unit)

Next, the glass panel unit 90 manufactured by using the pillar supply sheet 900 will be described.

As illustrated in FIGS. 12 and 13, the glass panel unit 90 includes a first substrate 1, a second substrate 2, a sealing member 5, and the plurality of (a large number of) pillars 4.

The first substrate 1 includes a glass plate 15 having a flat-plate shape and a coating 16 covering a first side (side facing the second substrate 2) in a thickness direction of the glass plate 15. The first substrate 1 has a second substrate 2 which faces a counter surface 12 and which is a surface of a coating 16.

The coating 16 is, for example, a thermal ray reflecting film but may be a film having other physical properties. In the first substrate 1, an appropriate coating may be applied, not to the first side in the thickness direction of the glass plate 15, but to a second side (on an opposite side of the glass plate 15 from the first side), or an appropriate coating may be applied to both the first side and the second side in the thickness direction of the glass plate 15.

The first substrate 1 includes at least the glass plate 15. The first substrate 1 is transparent generally but may be semi-transparent or non-transparent.

The second substrate 2 includes a glass plate 25 having a flat-plate shape. The second substrate 2 has a counter surface 22 which faces the first substrate 1 and which is a surface of the glass plate 25. The second substrate 2 includes at least the glass plate 25, and an appropriate coating may be applied to one or both sides in the thickness direction of the glass plate 25. The second substrate 2 is transparent generally but may be semi-transparent or non-transparent.

The plurality of pillars 4 lie sandwiched between the first substrate 1 and the second substrate 2 which are located to face each other. Each pillar 4 is in contact with the counter surface 12 of the first substrate 1 and the counter surface 22 of the second substrate 2, and thereby, a gap between the first substrate 1 and the second substrate 2 is maintained as a prescribed space.

The sealing member 5 lie sandwiched between the first substrate 1 and the second substrate 2. The sealing member 5 is hermetically bound to an entire peripheral portion of the counter surface 12 of the first substrate 1 and is hermetically bound to an entire peripheral portion of the counter surface 22 of the second substrate 2.

In the glass panel unit 90, an inside space 51 surrounded by the first substrate 1, the second substrate 2, and the sealing member 5 is hermetically sealed with the pressure therein being reduced to a prescribed degree of vacuum. The plurality of pillars 4 are located to be enclosed by the sealing member 5. The plurality of pillars 4 are accommodated in the inside space 51 which is depressurized. Note that the inside space 51 is not sealed in a reduced pressure state but may be sealed in a state where the inside space 51 is filled with gas, such as drying gas, having a thermal insulation property.

(Method for Manufacturing Glass Panel Unit)

Next, a method for manufacturing the glass panel unit 90 by using the pillar supply sheet 900 will be described.

The method for manufacturing the glass panel unit 90 includes a pillar mounting step, a binding step, an evacuation step, and a sealing step.

First, the pillar mounting step will be described.

The pillar mounting step (spacer mounting step) is a step of mounting the plurality of pillars 4 included in the pillar supply sheet 900 on the counter surface 22 of the second substrate 2. The plurality of pillars 4 are mounted on the counter surface 22 such that the plurality of pillars 4 are apart from each other in a matrix form. Note that the location where the plurality of pillars 4 are mounted is not limited to the counter surface 22 of the second substrate 2. The plurality of pillars 4 may be mounted on the counter surface 12 of the first substrate 1 or may be mounted on the counter surfaces 12 and 22 respectively of the first substrate 1 and the second substrate 2. The pillar mounting step will be described later in detail.

The binding step will be described.

The binding step is a step of hermetically binding the first substrate 1 and the second substrate 2 together with the sealing member 5 having a frame shape. The first substrate 1 and the second substrate 2 are disposed to face each other with the plurality of pillars 4 being sandwiched between the first substrate 1 and the second substrate 2.

Figure 11:
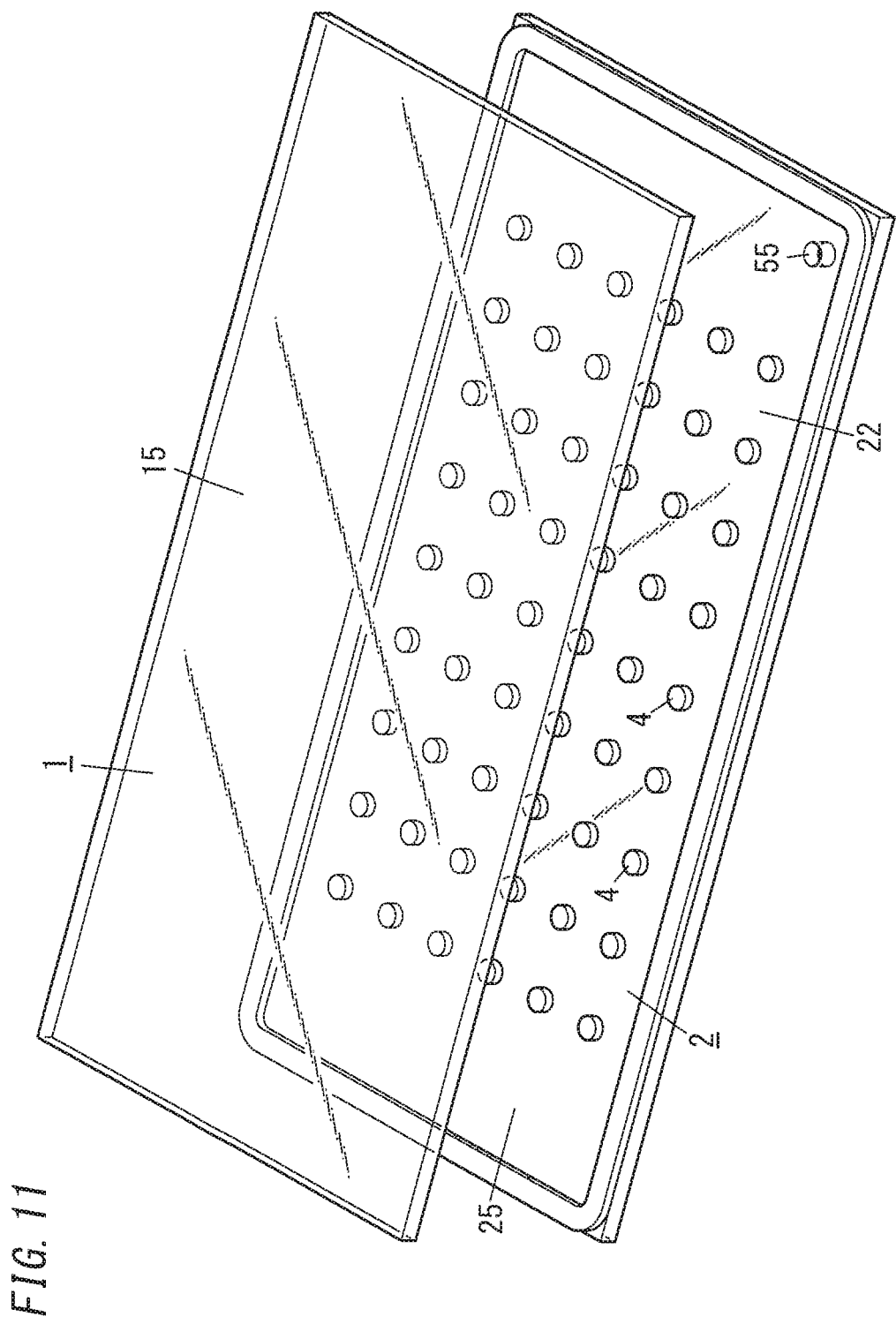
FIG. 11 is a perspective view illustrating a step in the course of manufacturing a glass panel unit by using the pillar supply sheet.

In the binding step, the sealing member 5 applied to the counter surface 22 of the second substrate 2 is heated and melted once to hermetically binding the first substrate 1 and the second substrate 2 together. Thus, between the first substrate 1 and the second substrate 2, an inside space 51 enclosed by the sealing member 5 is formed. When the binding step is completed, the inside space 51 communicates with an outside space through an exhaust port 55 (see FIG. 11) in the second substrate 2.

One of a timing of application of the sealing member 5 or a timing of mounting of the plurality of pillars 4 may be earlier than the other, or the enclosing and the mounting may be performed simultaneously. The exhaust port 55 communicating with the inside space 51 may be formed in the first substrate 1 or may be formed in each of the first substrate 1 and the second substrate 2.

The evacuation step will be described.

The evacuation step is performed after the binding step. In the evacuation step, air in the inside space 51 is exhausted to the outside through the exhaust port 55, and the pressure in the entirety of the inside space 51 is reduced to achieve a prescribed degree of vacuum (e.g., degree of vacuum lower than or equal to 0.1 Pa). The exhausting process through the exhaust port 55 is performed by any vacuum pump or the like via, for example, an exhaust pipe connected to the second substrate 2 to be in communication with the exhaust port 55.

The sealing step will be described.

The sealing step is performed after the evacuation step. In the sealing step, the exhaust port 55 is sealed while the reduced pressure state of the inside space 51 is maintained, thereby obtaining the glass panel unit 90 including the inside space 51 which is depressurized.

Next, the pillar mounting step will be described in detail with reference to FIGS. 8A to 10D.

The method for mounting the plurality of pillars 4 in the pillar mounting step includes, for example, a first mounting method adopting a picking technique, a second mounting method adopting a transferring technique, and a third mounting method adopting both the picking technique and the transferring technique.

FIGS. 8A to 8C show a procedure for mounting the plurality of pillars 4 on the second substrate 2 by the first mounting method adopting the picking technique.

As illustrated in FIG. 8A, in the first mounting method, the pillar supply sheet 900 is set in a location adjacent to the second substrate 2. The pillar supply sheet 900 is set to take a position so that the plurality of pillars 4 are located on the adhesion layer 65 on the carrier sheet 60.

Next, as illustrated in FIGS. 8B and 8C, the pillars 4 included in the pillar supply sheet 900 are peeled from the adhesion layer 65 by using the suction pins 85 configured to suck air from its tip and are sequentially mounted on prescribed locations on the upper surface (counter surface 22) of the second substrate 2.

As described above, the adhesion layer 65 is preferably configured to weakly adhere (stick) to the pillars 4 or is preferably configured such that the adhesiveness of the adhesion layer 65 is reduced by the external stimulation such as light or heat.

In the former case, the suction pin 85 easily detaches each pillar 4.

In the latter case, external stimulation is given to the adhesion layer 65 in the pillar mounting step to reduce the adhesive strength, which enables the suction pin 85 to easily detach each pillar 4. The adhesion layer 65 preferably has, for example, a property that the adhesive strength is reduced by being heated or a property that the adhesive strength is reduced by irradiation of light (ultraviolet radiation).

In the first mounting method, the plurality of pillars 4 are mounted on the second substrate 2 by the picking technique but may be mounted on the first substrate 1 by the same picking technique or may be mounted on both the first substrate 1 and the second substrate 2 by the same picking technique.

Note that a droplet of liquid, such as a droplet of water, may be preferably applied to the second substrate 2 in advance so that each pillar 4 is easily mounted on the second substrate 2. Each pillar 4 is easily mounted on the second substrate 2 due to adsorption on the droplet of liquid.

FIGS. 9A to 9C show a procedure for mounting the plurality of pillars 4 on the second substrate 2 by the second mounting method adopting the transferring technique.

In the second mounting method, as illustrated in FIG. 9A, the pillar supply sheet 900 is transported to a location adjacent to the second substrate 2, and then, as illustrated in FIG. 9B, the pillar supply sheet 900 is held in a transfer position. In this position, the plurality of pillars 4 included in the pillar supply sheet 900 are pressed against the upper surface of the second substrate 2. The transfer position of the pillar supply sheet 900 is a position that the plurality of pillars 4 are located below the carrier sheet 60 and the adhesion layer 65.

Then, as illustrated in FIG. 9C, the carrier sheet 60 is lifted to be separated from the second substrate 2, so that the plurality of pillars 4 are left on the second substrate 2. In this way, the plurality of pillars 4 included in the pillar supply sheet 900 are collectively mounted on the second substrate 2 in a prescribed arrangement.

Note that droplets of liquid, such as droplets of water, are preferably applied to the second substrate 2 in advance so that the plurality of pillars 4 easily remain on the second substrate 2. Each pillar 4 transferred to the second substrate 2 easily remains on the second substrate 2 due to adsorption on the droplet of liquid.

Moreover, the pillar supply sheet 900 (see FIG. 6B) of the second variation is preferably used so that the plurality of pillars 4 easily remain on the second substrate 2. When the pillar supply sheet 900 of the second variation is used, each pillar 4 is bonded to the second substrate 2 with the second adhesion layer 82, and therefore, each pillar 4 easily remains on the second substrate 2.

Also in the second mounting method, the adhesion layer 65 of the pillar supply sheet 900 is preferably configured to weakly adhere (stick) to each pillar 4 or is preferably configured such that the adhesiveness of the adhesion layer 65 is reduced by the external stimulation such as light or heat.

In the former case, each pillar 4 is easily detached from the carrier sheet 60 during the transfer.

In the latter case, external stimulation is given to the adhesion layer 65 during the transfer to reduce the adhesive strength, so that each pillar 4 is easily detached from the carrier sheet 60. The adhesion layer 65 preferably has, for example, a property that the adhesive strength is reduced by being heated or a property that the adhesive strength is reduced by irradiation of light (ultraviolet radiation).

In this case, the adhesive agent forming the adhesion layer 65 preferably has a property different from that of the adhesive agent forming the second adhesion layer 82. For example, it is preferable to form the adhesion layer 65 from an adhesive agent whose adhesive strength is reduced by being heated and to form the second adhesion layer 82 from an adhesive agent whose adhesive strength is increased by being heated. Alternatively, it is preferable to form the adhesion layer 65 from an adhesive agent whose adhesive strength is reduced by being irradiated with light (ultraviolet radiation) and to form the second adhesion layer 82 from an adhesive agent whose adhesive strength is increased by being irradiated with light (ultraviolet radiation).

In the second mounting method, the plurality of pillars 4 are mounted on the second substrate 2 by the transferring technique but may be mounted on the first substrate 1 by the same transferring technique or may be mounted on both the first substrate 1 and the second substrate 2 by the same transferring technique.

FIGS. 10A to 10D show a procedure for mounting the plurality of pillars 4 on the second substrate 2 by the third mounting method adopting both the picking technique and the transferring technique.

In the third mounting method, a rearrangement step adopting the picking technique and a transferring step adopting the transferring technique are performed to mount the plurality of pillars 4 included in the pillar supply sheet 900 on the second substrate 2 in a prescribed arrangement.

As illustrated in FIGS. 10A and 10B, in the rearrangement step, the plurality of pillars 4 are detached from the carrier sheet 60 and are then rearranged on the transferring sheet 70 different from the carrier sheet 60 in the prescribed arrangement and a prescribed position. For rearrangement of the plurality of pillars 4, suction pins 85 similar to that in the first mounting method are preferably used.

The transferring sheet 70 has one surface (upper surface) on which an adhesion layer 75 is formed. Each pillar 4 is bonded to the transferring sheet 70 with the adhesion layer 75 in a prescribed arrangement.

As illustrated in FIG. 10C, in the transferring step, the transferring sheet 70 on which the plurality of pillars 4 are rearranged is held in a transfer position, in which the plurality of pillars 4 are pressed against the upper surface (counter surface 22) of the second substrate 2. When the transferring sheet 70 takes the transfer position, the plurality of pillars 4 are located below the transferring sheet 70 and the adhesion layer 75.

Then, as illustrated in FIG. 10D, the transferring sheet 70 is lifted to be separated from the second substrate 2, so that the plurality of pillars 4 are left on the second substrate 2. In this way, the plurality of pillars 4 included in the pillar supply sheet 900 are collectively mounted on the second substrate 2 in a prescribed arrangement.

Note that in the third mounting method, similarly to the second mounting method, droplets of liquid, such as droplets of water, are preferably applied to the second substrate 2 in advance so that the plurality of pillars 4 easily remain on the second substrate 2. Each pillar 4 transferred to the second substrate 2 easily remains on the second substrate 2 due to adsorption on the droplet of liquid.

Also in the third mounting method, the adhesion layer 65 of the pillar supply sheet 900 is preferably configured to weakly adhere (stick) to each pillar 4 or is preferably configured such that the adhesiveness of the adhesion layer 65 is reduced by the external stimulation such as light or heat.

In the former case, each pillar 4 is easily detached from the carrier sheet 60 during the picking.

In the latter case, external stimulation is given to the adhesion layer 65 during the picking to reduce the adhesive strength, so that each pillar 4 is easily detached from the carrier sheet 60. The adhesion layer 65 preferably has, for example, a property that the adhesive strength is reduced by being heated or a property that the adhesive strength is reduced by irradiation of light (ultraviolet radiation)

The adhesion layer 75 formed on the transferring sheet 70 is preferably configured to weakly adhere (stick) to each pillar 4 or is preferably configured such that the adhesiveness of the adhesion layer 65 is reduced by the external stimulation such as light or heat.

In the former case, each pillar 4 is easily detached from the transferring sheet 70 during the transfer.

In the latter case, external stimulation is given to the adhesion layer 75 during the transfer to reduce the adhesive strength, so that each pillar 4 is easily detached from the transferring sheet 70. The adhesion layer 75 preferably has, for example, a property that the adhesive strength is reduced by being heated or a property that the adhesive strength is reduced by being irradiated with light (ultraviolet radiation).

In the third mounting method, the plurality of pillars 4 are mounted on the second substrate 2 but may be mounted on the first substrate 1 or may be mounted on both the first substrate 1 and the second substrate 2.

(Variations of Glass Panel Unit)

Figure 14:
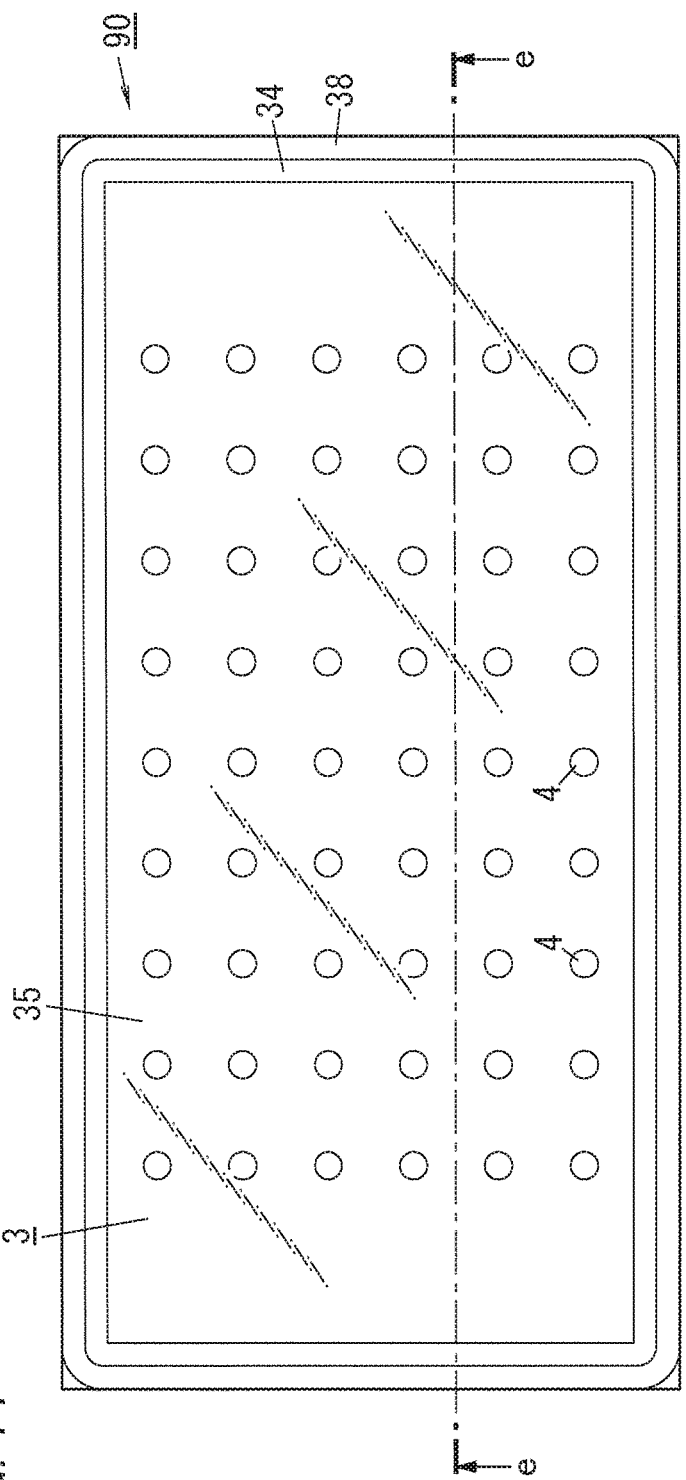
FIG. 14 is a plan view illustrating a variation of the glass panel unit.

Next, a variation of the glass panel unit 90 will be described with reference to FIGS. 14 to 16.

The variation of the glass panel unit 90 further includes a third substrate 3 located to face a first substrate 1 and a second sealing member 38 hermetically binding entire peripheral portions of the first substrate 1 and the third substrate 3 together.

Any appropriate panel may be adopted as the third substrate 3 as long as the third substrate 3 includes at least a glass pane. The third substrate 3 is transparent generally but may be semi-transparent or non-transparent.

Between counter surfaces 14 and 32 respectively of the first substrate 1 and the third substrate 3, a second inner space 52 which is sealed is formed.

The third substrate 3 is disposed to face one substrate of the first substrate 1 and a second substrate 2. When the third substrate 3 is disposed to face the second substrate 2, the second sealing member 38 is bound to peripheral portions of the second substrate 2 and the third substrate 3, and the second inner space 52 is formed between the second substrate 2 and the third substrate 3 (see FIG. 16).

Figure 15:
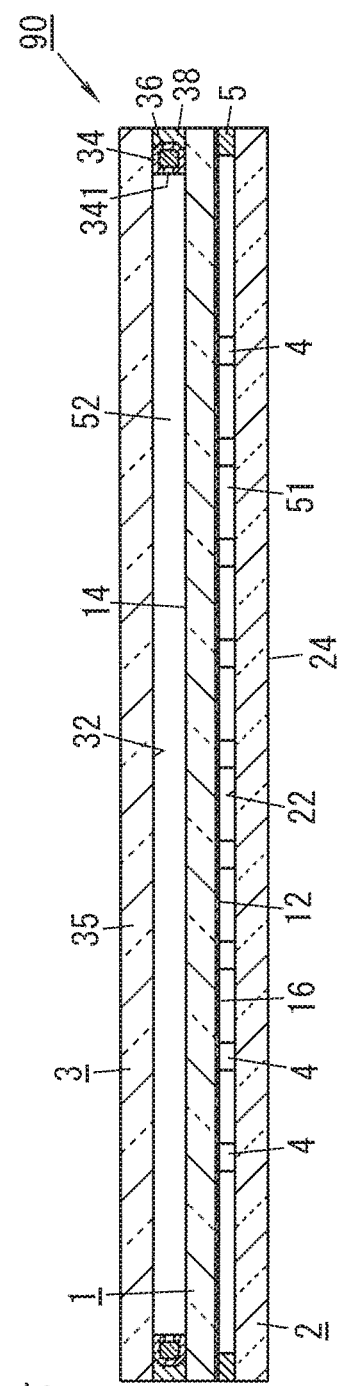
FIG. 15 is a sectional view taken along line e-e of FIG. 14.
Figure 16:
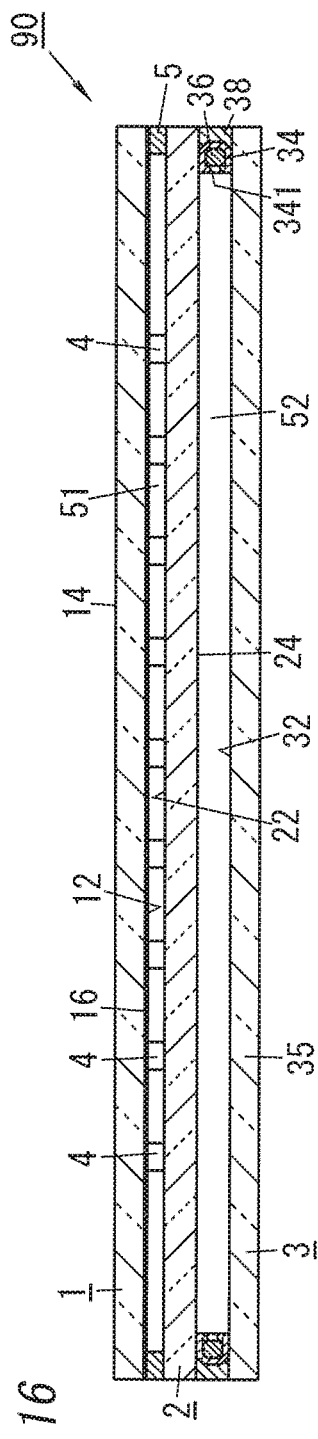
FIG. 16 is a sectional view illustrating another variation of the glass panel unit.

As illustrated in FIG. 15, a spacer 34 having a hollow is further disposed on an inner side of the second sealing member 38 having a frame shape. The hollow of the spacer 34 is filled with a desiccant 36.

The spacer 34 is made of metal such as aluminum and has an inner circumferential side having a through hole 341. The hollow of the spacer 34 communicates with the second inner space 52 via the through hole 341. The desiccant 36 is, for example, a silica gel. The second sealing member 38 is preferably made of, for example, a highly airtight resin such as a silicon resin and butyl rubber.

The second inner space 52 is a sealed space sealed with the first substrate 1 (or the second substrate 2), the third substrate 3, and the second sealing member 38. The second inner space 52 is filled with a drying gas. The dry gas is, for example, a dry rare gas such as argon gas or dry air. The dry air includes air dried after sealed in the second inner space 52 due to the effect of the desiccant 36.

In the variation of the glass panel unit 90, an inside space 51 and the second inner space 52 are provided between the third substrate 3 and the second substrate 2 (or the first substrate 1), thereby providing a high thermal insulation property. The third substrate 3 is located on one end in a thickness direction of the glass panel unit 90, and the second substrate 2 (or the first substrate 1) is located on the other end in the thickness direction. The second inner space 52 is filled with a drying gas.

A method for manufacturing the variation of the glass panel unit 90 further includes a second binding step in addition to the pillar forming step, the pillar mounting step, the binding step, the evacuation step, and the sealing step. The second binding step is a step of binding the first substrate 1 (or the second substrate 2) and the third substrate 3 together with the second sealing member 38.

(Glass Window)

Next, the glass window 9 manufactured from the glass panel unit 90 will be described.

Figure 17:
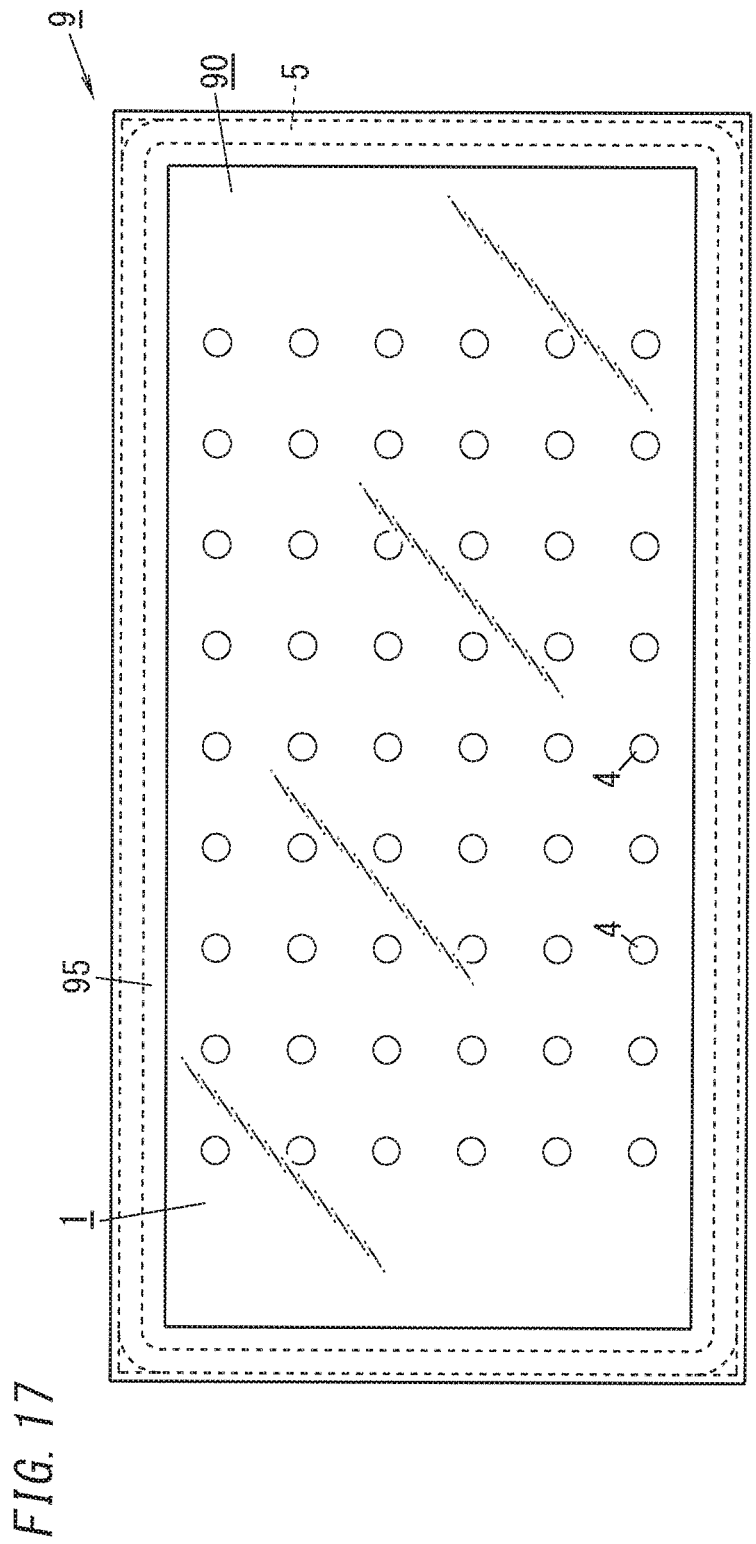
FIG. 17 is a plan view illustrating a glass window manufactured from the glass panel unit.

The glass window 9 shown in FIG. 17 includes the glass panel unit 90 and a window frame 95. The glass panel unit 90 is rectangular in front view. The window frame 95 is fitted to a peripheral portion of the glass panel unit 90 and has a rectangular frame shape. In the glass window 9, when viewed from the front side, the sealing member 5 of the glass panel unit 90 is preferably hidden by the window frame 95.

A method for manufacturing the glass window 9 includes a fitting step of fitting the window frame 95 to the glass panel unit 90 in addition to the steps for manufacturing the glass panel unit 90. In the fitting step, the window frame 95 may be fitted to a peripheral portion of the variation of the glass panel unit 90.

(Aspects)

As can be seen from the above-described embodiment and variation, the method for manufacturing a pillar supply sheet of a first aspect is a method for manufacturing a pillar supply sheet (900). The pillar supply sheet (900) includes a plurality of pillars (4) for maintenance of a distance between a first substrate (1) and a second substrate (2) included in a glass panel unit (90); a carrier sheet (60) on which the plurality of pillars (4) are arranged apart from each other, and an adhesion layer (65) between the carrier sheet (60) and the plurality of pillars (4). The method for manufacturing the pillar supply sheet of the first aspect includes a pillar forming step of forming the plurality of pillars (4) by subjecting a base member (40) to an etching process or a laser irradiation process and removing an unnecessary portion (45) from the base member (40).

Thus, the method for manufacturing the pillar supply sheet of the first aspect enables appropriate and easy mounting of the plurality of pillars (4) on at least one of the first substrate (1) or the second substrate (2) by using the pillar supply sheet (900). Additionally, forming each pillar (4) by laser irradiation or etching enables a reduction of burrs formed on the pillars (4) thus formed. If the pillars (4) have large burrs, the burrs result in that the pillars (4) appear to be large, or the pillars (4) are easily damaged due to the burrs when pressure is applied to the pillars (4). These problems are solved by the method for manufacturing the pillar supply sheet of the first aspect.

A method for manufacturing a pillar supply sheet of a second aspect is realizable in combination with the first aspect. The second aspect further includes a preparation step of preparing an in-process product (81). The in-process product (81) includes the carrier sheet (60), the adhesion layer (65) on the carrier sheet (60), and the base member (40) on the adhesion layer (65). The pillar forming step is performed after the preparation step.

Thus, the method for manufacturing the pillar supply sheet of the second aspect enables the pillar supply sheet (900) to be efficiency manufactured.

A method for manufacturing a pillar supply sheet of a third aspect is realizable in combination with the second aspect. In the third aspect, the carrier sheet (60) has a higher transmittance of a laser beam than the base member (40). In the pillar forming step, the base member (40) bonded to the carrier sheet (60) is subjected to the laser irradiation process.

Thus, the method for manufacturing the pillar supply sheet of the third aspect enables the pillar supply sheet (900) to be efficiency manufactured by irradiating the in-process product (81) with the laser beam.

A method for manufacturing a pillar supply sheet of a fourth aspect is realizable in combination with the first aspect. The fourth aspect further includes a disposition step of disposing, on the carrier sheet (60), the plurality of pillars (4) formed in the pillar forming step.

Thus, the method for manufacturing the pillar supply sheet of the fourth aspect enables various aspects of pillar supply sheets (900) to be efficiency manufactured.

A method for manufacturing a pillar supply sheet of a fifth aspect is realizable in combination with any one of the first to fourth aspects. In the fifth aspect, the adhesion layer (65) is configured to weakly adhere to the plurality of pillars (4).

Thus, the method for manufacturing the pillar supply sheet of the fifth aspect enables each pillar (4) to be easily detached when the glass panel unit (90) is manufactured by using the pillar supply sheet (900).

A method for manufacturing a pillar supply sheet of a sixth aspect is realizable in combination with the fifth aspect. In the sixth aspect, the adhesion layer (65) has an adhesive strength of 1N/25 mm or less. The adhesive strength mentioned herein is shear adhesive strength measured by the 180° peeling test based on JIS standard number [JISZ0237].

Thus, the method for manufacturing the pillar supply sheet of the sixth aspect enables each pillar (4) to be easily detached when the glass panel unit (90) is manufactured by using the pillar supply sheet (900).

A method for manufacturing a pillar supply sheet of a seventh aspect is realizable in combination with any one of the first to fourth aspects. In the seventh aspect, the adhesion layer (65) has an adhesive strength which is reduced due to external stimulation given by light or heat.

Thus, according to the method for manufacturing the pillar supply sheet of the seventh aspect, it is possible to appropriately hold each pillar (4) while the pillar supply sheet (900) is stored and transported and to easily detach each pillar (4) when the pillar supply sheet (900) is used.

A method for manufacturing a pillar supply sheet of an eighth aspect is realizable in combination with any one of the first to seventh aspects. The eighth aspect further includes a second adhesion layer forming step. The second adhesion layer forming step is a step of providing a second adhesion layer (82) on a surface of each of the plurality of pillars (4). The surface is opposite a surface of each of the plurality of pillars (4) which is bonded to the adhesion layer (65).

Thus, the method for manufacturing the pillar supply sheet of the eighth aspect enables each pillar (4) to be bonded to the first substrate (1) or the second substrate (2) with the second adhesion layer (82).

A method for manufacturing a glass panel unit according to a ninth aspect includes a step of manufacturing the pillar supply sheet by the method for manufacturing the pillar supply sheet (900) of any one of the first to eighth aspects, a pillar mounting step, and a binding step. The pillar mounting step is a step of mounting the plurality of pillars (4) on at least one of the first substrate (1) or the second substrate (2). The binding step is a step of disposing the first substrate (1) and the second substrate (2) to face each other with the plurality of pillars (4) being sandwiched between the first substrate (1) and the second substrate (2) and hermetically binding the first substrate (1) and the second substrate (2) together with a sealing member (5) having a frame shape enclosing the plurality of pillars (4).

Thus, according to the method for manufacturing the glass panel unit of the ninth aspect, it is possible to effectively manufacture the glass panel unit (90) including the plurality of pillars (4) by using the pillar supply sheet (900). Additionally, the formation of a burr on each pillar (4) is reduced, and therefore, it is possible to reduce cases where the pillar (4) appears to be large due to the burr or cases where the first substrate (1) and/or the second substrate (2) are damaged by the burr.

A manufacturing method of a glass panel unit of a tenth aspect is realizable in combination with the ninth aspect. In the tenth aspect, in the pillar mounting step, the plurality of pillars (4) are detached from the carrier sheet (60) and are then transported to at least one of the first substrate (1) or the second substrate (2).

Thus, the method for manufacturing the glass panel unit of the tenth aspect enables the plurality of pillars (4) between the first substrate (1) and the second substrate (2) in various arrangement patterns.

A manufacturing method of a glass panel unit of an eleventh aspect is realizable in combination with the ninth aspect. In the eleventh aspect, in the pillar mounting step, the plurality of pillars (4) are transferred from the pillar supply sheet (900) to the first substrate (1) or the second substrate (2).

Thus, the method for manufacturing the glass panel unit of the eleventh aspect enables the plurality of pillar (4) to be efficiently mounted between the first substrate (1) and the second substrate (2).

A manufacturing method of a glass panel unit of a twelfth aspect is realizable in combination with the ninth aspect. In the twelfth aspect, the pillar mounting step includes a rearrangement step and transfer step. The rearrangement step is a step of detaching the plurality of pillars (4) from the carrier sheet (60) and then rearranging the plurality of pillars (4) on a transferring sheet (70) different from the carrier sheet (60). The transfer step is a step of transferring the plurality of pillars (4) from the transferring sheet (70) to the first substrate (1) or the second substrate (2).

Thus, according to the method for manufacturing the glass panel unit of the twelfth aspect, the arrangement of the plurality of pillars (4) on the carrier sheet (60) may differ from the arrangement of the plurality of pillar (4) on the transferring sheet (70). Thus, between the first substrate (1) and the second substrate (2), the plurality of pillars (4) are efficiently mounted in various arrangement patterns.

A manufacturing method of a glass panel unit of a thirteenth aspect is realizable in combination with any one of the ninth to twelfth aspects. The thirteenth aspect further includes a second binding step. The second binding step is a step of hermetically binding a third substrate (3) and the first substrate (1) or the second substrate (2) together with the second sealing member (38) having a frame shape. The third substrate (3) includes a glass plate (35).

Thus, according to the manufacturing method of the glass panel unit of the thirteenth aspect, it is possible to efficiently manufacture a glass panel unit (90) having a further high thermal insulation property.

A method for manufacturing a glass window of a fourteenth aspect includes a fitting step of fitting, into a window frame (95), the glass panel unit (90) manufactured by the method of any one of the ninth to thirteenth aspects.

Thus, the manufacturing method of the glass window of the fourteenth aspect enables efficient manufacturing of a glass window (9) having a high thermal insulation property.

REFERENCE SIGNS LIST

1 FIRST SUBSTRATE
15 GLASS PLATE
2 SECOND SUBSTRATE
25 GLASS PLATE
3 THIRD SUBSTRATE
35 GLASS PLATE
38 SECOND SEALING MEMBER
4 PILLAR
40 BASE MEMBER
45 UNNECESSARY PORTION
5 SEALING MEMBER
60 CARRIER SHEET
65 ADHESION LAYER
70 TRANSFERRING SHEET
81 IN-PROCESS PRODUCT
82 SECOND ADHESION LAYER
9 GLASS WINDOW
90 GLASS PANEL UNIT
95 WINDOW FRAME
900 PILLAR SUPPLY SHEET

The invention claimed is:

1. A method for manufacturing a glass panel unit, comprising:
a step of manufacturing a pillar supply sheet including a plurality of pillars for maintenance of a distance between a first substrate and a second substrate included in a glass panel unit, a carrier sheet on which the plurality of pillars are arranged apart from each other, and an adhesion layer between the carrier sheet and the plurality of pillars, the step including a pillar forming step of forming the plurality of pillars by subjecting a base member to an etching process or a laser irradiation process and removing an unnecessary portion from the base member;

a pillar mounting step of mounting the plurality of pillars on at least one of the first substrate or the second substrate by using the pillar supply sheet; and a binding step of:
- disposing the first substrate and the second substrate to face each other with the plurality of pillars being sandwiched between the first substrate and the second substrate, and
- hermetically binding the first substrate and the second substrate together with a sealing member having a frame shape enclosing the plurality of pillars, wherein in the pillar mounting step, the plurality of pillars are detached from the carrier sheet by being peeled from the adhesion layer on the carrier sheet and are then transported to at least one of the first substrate or the second substrate.

2. The method of claim 1, wherein
in the pillar mounting step,
the plurality of pillars are transferred from the pillar supply sheet to the first substrate or the second substrate.

3. The method of claim 1, wherein
the pillar mounting step includes:
- a rearrangement step of detaching the plurality of pillars from the carrier sheet and then rearranging the plurality of pillars on a transferring sheet different from the carrier sheet and
- a transfer step of transferring the plurality of pillars from the transferring sheet to the first substrate or the second substrate.

4. The method of claim 1, further comprising a second binding step of hermetically binding a third substrate including a glass plate and the first substrate or the second substrate together with a second sealing member having a frame shape.

5. A method for manufacturing a glass window, the method comprising a fitting step of fitting, into a window frame, the glass panel unit manufactured by the method of claim 1.

6. The method of claim 1, wherein the step of manufacturing the pillar supply sheet includes a disposition step of disposing, on the carrier sheet, the plurality of pillars formed in the pillar forming step.

7. The method of claim 1, wherein the adhesion layer has an adhesive strength of 1N/25 mm or less.

8. The method of claim 1, wherein the adhesion layer has an adhesive strength which is reduced due to external stimulation given by light or heat.

9. The method of claim 1, wherein the step of manufacturing the pillar supply sheet includes a second adhesion layer forming step of providing a second adhesion layer on a surface of each of the plurality of pillars, the surface being opposite a surface of each of the plurality of pillars which is bonded to the adhesion layer.

10. The method of claim 1, wherein
the step of manufacturing the pillar supply sheet includes a preparation step of preparing an in-process product including the carrier sheet, the adhesion layer on the carrier sheet, and the base member on the adhesion layer, and
the pillar forming step is performed after the preparation step.

11. The method of claim 10, wherein
the carrier sheet has a higher transmittance of a laser beam than the base member, and
in the pillar forming step, the base member bonded to the carrier sheet is subjected to the laser irradiation process.

* * * * *